(12) United States Patent
Nobutani et al.

(10) Patent No.: US 10,938,998 B2
(45) Date of Patent: Mar. 2, 2021

(54) INFORMATION PROCESSING APPARATUS

(71) Applicant: FUJI XEROX CO., LTD., Tokyo (JP)

(72) Inventors: Naoya Nobutani, Kanagawa (JP); Masafumi Ono, Kanagawa (JP); Toru Suzuki, Kanagawa (JP); Manabu Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/690,777

(22) Filed: Aug. 30, 2017

(65) Prior Publication Data

US 2018/0262630 A1 Sep. 13, 2018

(30) Foreign Application Priority Data

Mar. 13, 2017 (JP) .............................. JP2017-047198

(51) Int. Cl.
*G06K 15/00* (2006.01)
*H04N 1/00* (2006.01)
*G06F 3/16* (2006.01)

(52) U.S. Cl.
CPC ..... *H04N 1/00076* (2013.01); *H04N 1/00042* (2013.01); *H04N 1/00082* (2013.01); *H04N 1/00251* (2013.01); *G06F 3/165* (2013.01); *H04N 2201/0094* (2013.01)

(58) Field of Classification Search
CPC .......... H04N 1/00076; H04N 1/00042; H04N 1/00251; H04N 1/00082; H04N 2201/0094; G06F 3/165
See application file for complete search history.

(56) References Cited

U.S. PATENT DOCUMENTS

| | | | | |
|---|---|---|---|---|
| 8,917,186 | B1 * | 12/2014 | Grant | G08B 29/126 |
| | | | | 340/692 |
| 2014/0313417 | A1 | 10/2014 | Tateishi | |
| 2014/0355020 | A1 * | 12/2014 | Shiraishi | H04N 1/00896 |
| | | | | 358/1.13 |
| 2016/0301373 | A1 * | 10/2016 | Herman | H03G 3/3005 |
| 2016/0352926 | A1 * | 12/2016 | Ueta | H04N 1/00352 |
| 2017/0061750 | A1 * | 3/2017 | Eyring | G08B 13/19695 |
| 2017/0061776 | A1 * | 3/2017 | Scaria | G08B 21/025 |
| 2018/0097493 | A1 * | 4/2018 | Weksler | H04R 3/00 |

FOREIGN PATENT DOCUMENTS

| | | | |
|---|---|---|---|
| JP | 11203098 | A * | 7/1999 |
| JP | 5705823 | B2 | 4/2015 |
| JP | 2015210502 | A * | 11/2015 |
| JP | 5910846 | B2 | 4/2016 |

* cited by examiner

*Primary Examiner* — Huo Long Chen
(74) *Attorney, Agent, or Firm* — Oliff PLC (57) ABSTRACT

An information processing apparatus includes a sensor, an output unit, and a controller. The sensor senses a person. The output unit outputs a notification sound. The controller controls a volume of the notification sound. The controller controls the output unit to reduce the volume of the notification sound.

9 Claims, 5 Drawing Sheets

INFORMATION PROCESSING APPARATUS

CROSS-REFERENCE TO RELATED APPLICATIONS

This application is based on and claims priority under 35 USC 119 from Japanese Patent Application No. 2017-047198 filed Mar. 13, 2017.

BACKGROUND

Technical Field

The present invention relates to an information processing apparatus.

SUMMARY

According to an aspect of the invention, there is provided an information processing apparatus including a sensor, an output unit, and a controller. The sensor senses a person. The output unit outputs a notification sound. The controller controls a volume of the notification sound. The controller controls the output unit to reduce the volume of the notification sound.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to FIGS. 1 to 5. In the exemplary embodiment, an image processing apparatus will be described as an example of an information processing apparatus.

First Exemplary Embodiment

Figure 1:
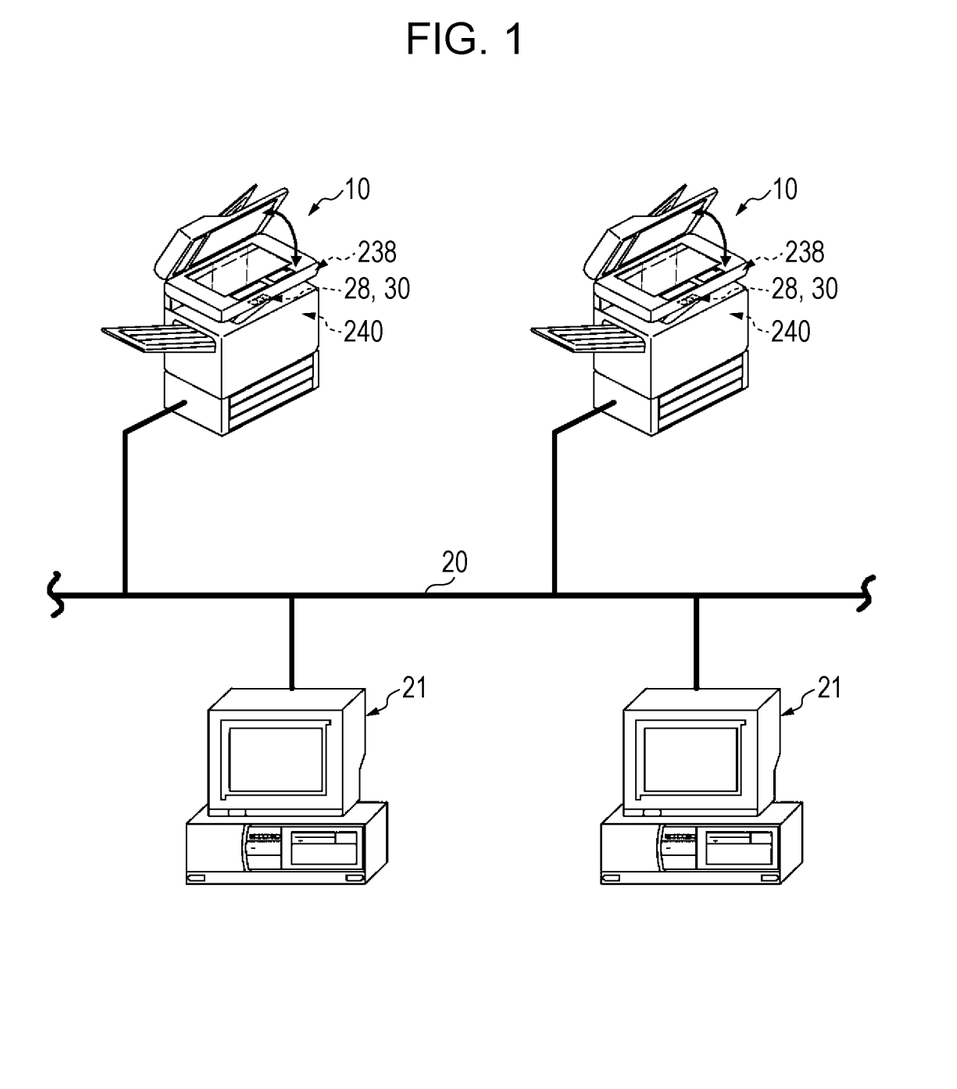
FIG. 1 is a connection diagram illustrating an example of connections in a communication network including an image processing apparatus according to an exemplary embodiment.

As illustrated in FIG. 1, image processing apparatuses 10 according to an exemplary embodiment are connected to a communication network 20 such as the Internet. Two image processing apparatuses 10 are connected in FIG. 1, but the number of image processing apparatuses 10 is not limited and may be one or three or more.

In addition, plural personal computers (PCs) 21, which serve as information terminal apparatuses, are connected to the communication network 20. Two PCs 21 are connected in FIG. 1, but the number of PCs 21 is not limited and may be one or three or more. The information terminal apparatuses are not limited to the PCs 21, and the connection style is not limited to wired connection. That is, a communication network in which information is transmitted and received in a wireless manner may be used.

Referring to FIG. 1, a user may transfer data to one of the image processing apparatuses 10 from his/her PC 21 and provide an instruction to perform image formation (printing) through a remote operation, for example, or the user may perform various operations in front of the image processing apparatus 10 to provide an instruction to perform a process of copying, scanning (image reading), facsimile transmission/reception, or the like.

Figure 2:
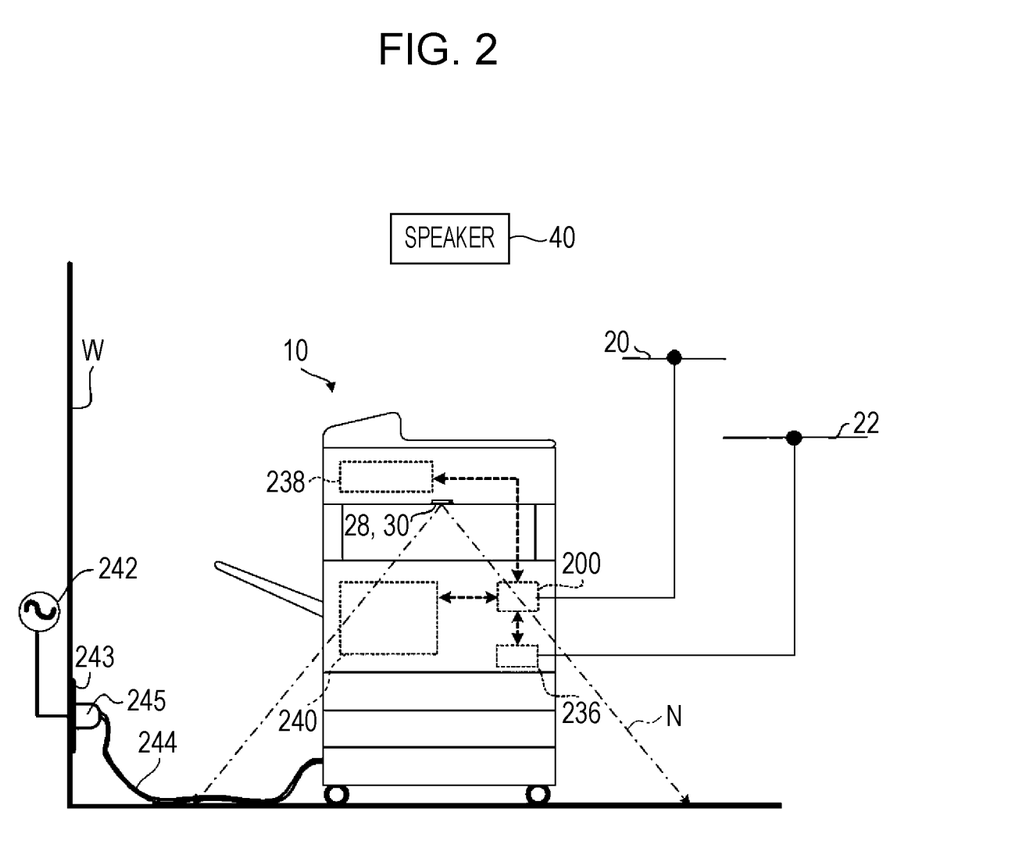
FIG. 2 is a schematic diagram illustrating an example of the image processing apparatus according to the exemplary embodiment.

FIG. 2 illustrates one of the image processing apparatuses 10 according to the exemplary embodiment. The image processing apparatus 10 includes an image forming unit 240 that forms an image on recording paper, which is an example of a recording medium, an image reading unit 238 that reads a document image, and a facsimile communication control circuit 236. The image processing apparatus 10 also includes a main controller 200, which controls the image forming unit 240, the image reading unit 238, and the facsimile communication control circuit 236, so as to temporarily store image data of a document image read by the image reading unit 238 or to transmit the read image data to the image forming unit 240 or the facsimile communication control circuit 236.

The main controller 200 is connected to the communication network 20 such as the Internet, and the facsimile communication control circuit 236 is connected to a telephone network 22. The main controller 200 is connected to a host computer through the communication network 20 and has a function of receiving image data and performing facsimile reception and transmission by using the telephone network 22 through the facsimile communication control circuit 236, for example.

The image reading unit 238 includes a document grass on which a document is positioned, a scanning driving system that scans an image of the document positioned on the document glass by irradiating the document with light, and a photoelectric conversion device, such as a charge coupled device (CCD), that receives light reflected or transmitted as a result of scanning by the scanning driving system and converts the light to an electric signal.

The image forming unit 240 includes a photoconductive body. Around the photoconductive body, there are provided a charging device that causes the photoconductive body to be evenly charged, a scanning exposure unit that performs scanning using a light beam on the basis of image data, an image developing unit that develops a static latent image formed through scanning exposure performed by the scanning exposure unit, a transfer unit that transfers the developed image on the photoconductive body onto recording paper, and a cleaning unit that cleans a surface of the photoconductive body after transferring has finished. In addition, a fixing unit that fixes the image transferred onto the recording paper is disposed on a transport path for transporting the recording paper.

As illustrates in FIG. 2, in the image processing apparatus 10, a plug 245 is attached to an end of an input power line 244. When the plug 245 is inserted into a wiring plate 243 for a commercial power supply 242, which is wired to a wall W, the image processing apparatus 10 is supplied with power from the commercial power supply 242.

FIG. 2 illustrates a first sensor 28, a second sensor 30, a speaker 40, and a sensing region N of the second sensor 30. The first sensor 28 and the second sensor 30 sense a distance between the image processing apparatus 10 and a person (user). The speaker 40 is equipment provided to the floor where the image processing apparatus 10 is installed, and is located on the wall W, for example. The speaker 40 is used as an alternative to or together with a speaker 32 (described below) included in the image processing apparatus 10 so as to serve as a sound output device that is used to provide a notification according to the exemplary embodiment.

Next, a description will be given of a hardware configuration of a control system of the image processing apparatus 10 with reference to FIG. 3.

As described above, the main controller 200 is connected to the communication network 20. The main controller 200 is connected to the facsimile communication control circuit 236, the image reading unit 238, the image forming unit 240, and a UI touch screen 216 through buses 33A to 33D such as a data bus or control bus, respectively. That is, the main controller 200 predominantly controls the individual processing units of the image processing apparatus 10.

The image processing apparatus 10 also includes a power supply device 202, which is connected to the main controller 200 through a bus 33E. The power supply device 202 is supplied with power from the commercial power supply 242. Power supply lines 35A to 35D are provided for the power supply device 202, which independently supply power to the main controller 200, the facsimile communication control circuit 236, the image reading unit 238, the image forming unit 240, and the UI touch screen 216, respectively.

The main controller 200 includes a central processing unit (CPU), a read only memory (ROM), and a random access memory (RAM), which are not illustrated. The CPU controls the entire image processing apparatus 10. The ROM is a memory that stores, in advance, a control program for the image processing apparatus 10, a volume control process program described below, or the like. The RAM is a memory that is used as a working area or the like when a program such as the control program is executed.

Figure 3:
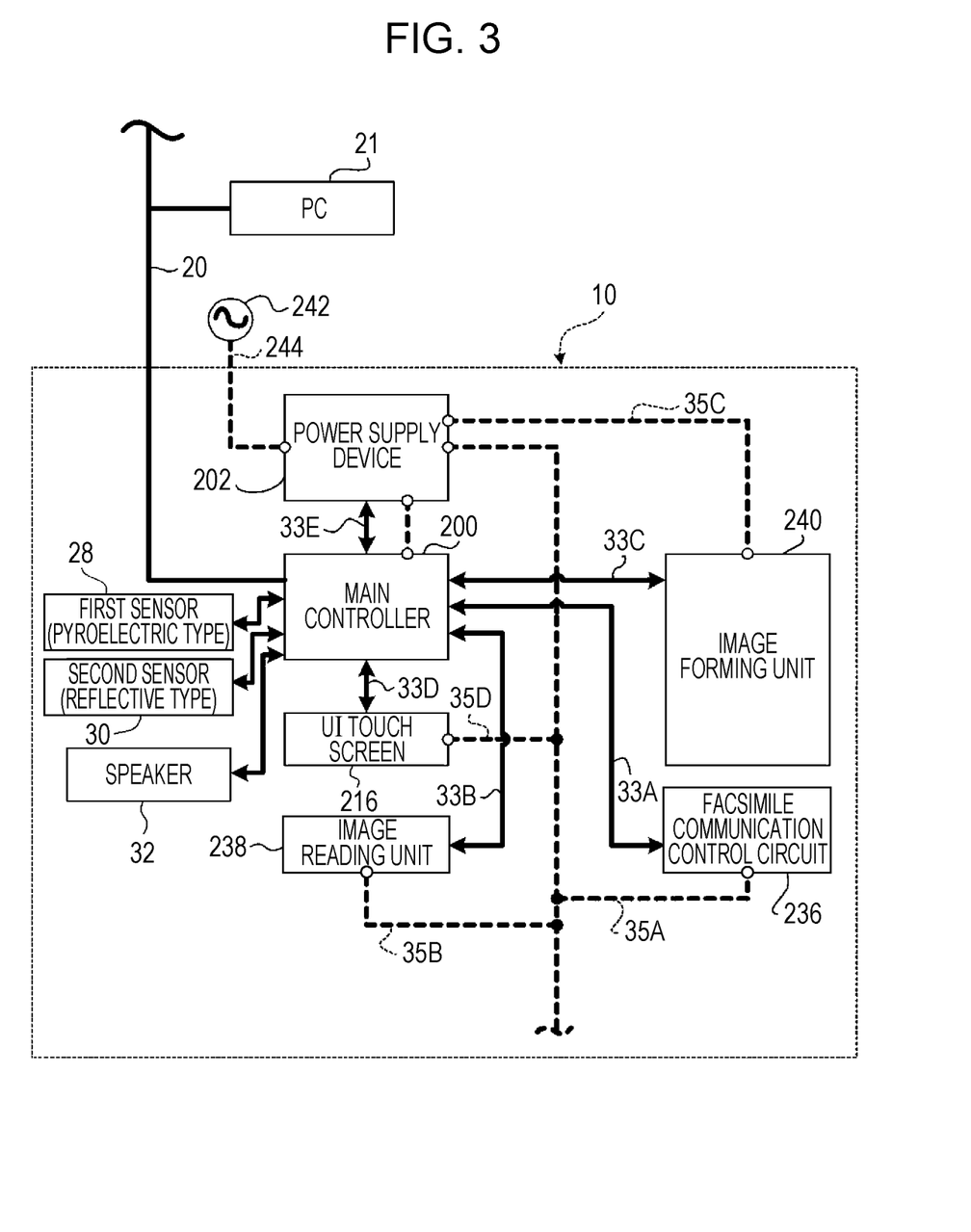
FIG. 3 is a block diagram illustrating an example configuration of a control system of the image processing apparatus according to the exemplary embodiment.

As illustrated in FIG. 3, the main controller 200 is connected to the first sensor 28, the second sensor 30, and the speaker 32. The first sensor 28 and the second sensor 30 according to the exemplary embodiment monitor to sense the presence or absence of a person around the image processing apparatus 10. The speaker 32 according to the exemplary embodiment serves as a sound output device that is used to provide a notification, which will be described below.

It has become common to equip an information processing apparatus with a sound output function so as to provide guidance or the like of the information processing apparatus to a user who uses the information processing apparatus. The image processing apparatus 10 according to the exemplary embodiment includes the speaker 32 for providing guidance or the like.

Furthermore, applying the characteristic of the image processing apparatus 10 that the image processing apparatus 10 is used by plural persons in an office, for example, the image processing apparatus 10 may be equipped with a function of outputting a sound not only for a user in front of the apparatus but also over a wider range (for example, a range of about a ten-meter radius), that is, an announcement function of providing information to plural persons by using a sound. In this case, for the purpose of transmitting a sound of announcement over a wide range, it is necessary to output the sound at a high volume so that a person away from the image processing apparatus 10 is able to hear the sound, unlike in the case according to the related art where a sound is output only for a user in front of the apparatus.

However, if the sound is output at a high volume so that a person away from the image processing apparatus 10 is able to hear the sound and if another person is sitting at a desk in front of the image processing apparatus 10 in the office, for example, the nearby person may feel uncomfortable due to the high volume although the distant person easily hears the sound. Furthermore, such a loud sound may surprise a user of the image processing apparatus 10 or a person passing by the image processing apparatus 10. That is, it is necessary to output a sound at a volume suitable for individual persons in consideration of a volume of an output sound and a positional relationship between the image processing apparatus 10 and a person around the image processing apparatus 10 or a person using the image processing apparatus 10.

Accordingly, in an exemplary embodiment of the present invention, the presence of a user of the information processing apparatus or a distance between the information processing apparatus and a person around the information processing apparatus is sensed, and accordingly the volume of the sound output device is adjusted. As a result, there is provided the information processing apparatus having a function of performing control to output a sound at a volume suitable for a person who is near a sound source in the case of providing a notification about something over a wide range.

Hereinafter, a description will be given of a method for recognizing, in the image processing apparatus 10 according to the exemplary embodiment, a distance between the image processing apparatus 10 and a person around the image processing apparatus 10 with reference to FIG. 4. The image processing apparatus 10 recognizes the distance by using the first sensor 28 and the second sensor 30 (hereinafter these sensors may be collectively referred to as "human sensors").

The first sensor 28 has specifications for sensing a motion of a person around the image processing apparatus 10. A representative example thereof is an infrared sensor using a pyroelectric effect of a pyroelectric element (pyroelectric sensor). In the exemplary embodiment, a pyroelectric sensor is used as the first sensor 28.

The most distinctive feature of the sensor using a pyroelectric effect of a pyroelectric element used as the first sensor 28 is that the sensing region is large. This type of sensor is configured to sense a motion of a person, and thus does not sense the presence of a person if the person is at rest in the sensing region. For example, in a case where a high-level signal is output when a person is in motion, the signal changes to a low-level signal when the person in the sensing region stops moving.

On the other hand, the second sensor 30 has specifications for sensing the presence or absence of a person. A representative example of the sensor used as the second sensor 30 is a reflective sensor including a light emitter and a light receiver. The light emitter and the light receiver may be separated from each other.

The most distinctive feature of the reflective sensor or the like used as the second sensor 30 is that the sensor reliably senses the presence or absence of a person in accordance with whether or not the light to the light receiver is blocked or not blocked. In addition, an amount of light entering the light receiver is limited by an amount of light emitted by the light emitter, and thus the sensing region is relatively small.

The first sensor 28 and the second sensor 30 are not limited to a pyroelectric sensor and a reflective sensor as long as the first sensor 28 and the second sensor 30 implement the following functions.

As described above, the first sensor 28 and the second sensor 30 have different sensing regions. FIG. 4 illustrates the sensing regions of the individual sensors, in which F denotes the sensing region of the first sensor 28 and N denotes the sensing region of the second sensor 30. As illustrated in FIG. 4, the sensing region F of the first sensor 28 is larger than the sensing region N of the second sensor 30. In addition, a setting is made so that the sensing region N is included in the sensing region F.

Figure 4:
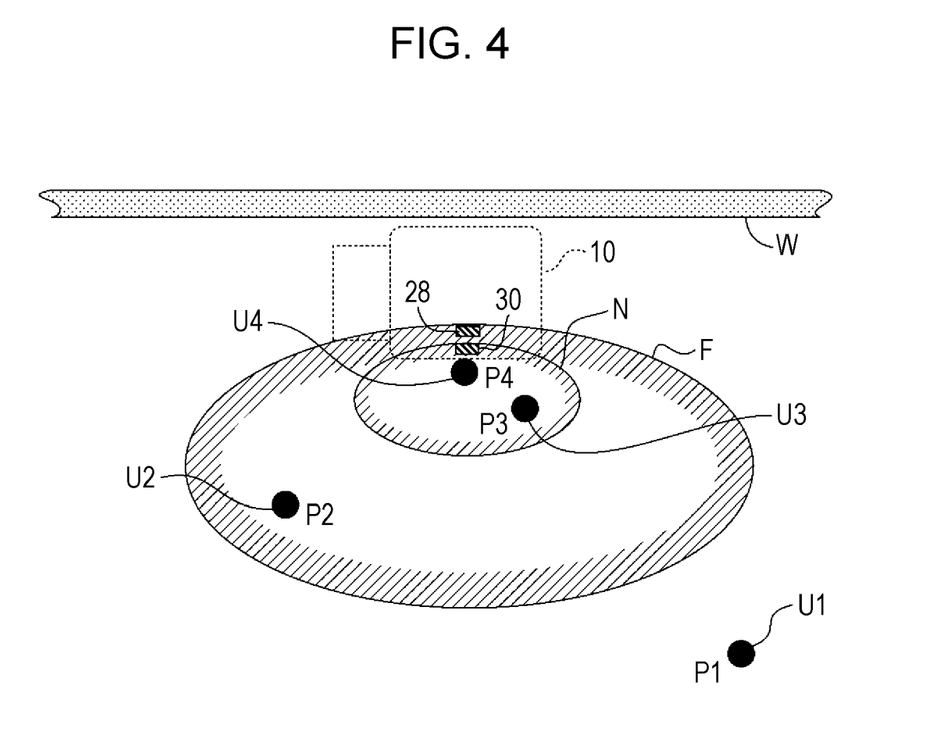
FIG. 4 is a plan view illustrating the image processing apparatus according to the exemplary embodiment and the surroundings thereof.

FIG. 4 illustrates four patterns as an example of the positions of persons around the image processing apparatus 10. That is, a person U1 is at a position P1, a person U2 is at a position P2, a person U3 is at a position P3, and a person U4 is at a position P4. For example, the person U1 is at a certain distance (for example, 10 m) from the image processing apparatus 10 and is outside the sensing region F. Thus, the person U1 is not sensed by the first sensor 28 and the second sensor 30. For example, the person U2 passes by near the image processing apparatus 10 (for example, at a distance of 1 to 2 m from the image processing apparatus 10) and is inside the sensing region F and outside the sensing region N. Thus, the person U2 is sensed by the first sensor 28 but is not sensed by the second sensor 30. The person U3 is very close to the image processing apparatus 10 (for example, within 1 m from the image processing apparatus 10) although not using the image processing apparatus 10, and is sensed by the second sensor 30. The person U4 is using the image processing apparatus 10, is sensed by the second sensor 30, and is recognized by the main controller 200 when the person U4 is operating the image processing apparatus 10 (for example, the UI touch screen 216).

The main controller 200 of the image processing apparatus 10 recognizes distances between the image processing apparatus 10 and persons around the image processing apparatus 10 in an analog manner through multiple steps by using information obtained from the human sensors that are classified as described above. In the case of outputting a sound over a wide range of a space where the image processing apparatus 10 is installed, the main controller 200 performs control so that the sound is output at a volume suitable for individual persons in accordance with distances between the image processing apparatus 10 and the persons around the image processing apparatus 10 and the usage status of the image processing apparatus 10. That is, the main controller 200 determines how much the volume is to be reduced in accordance with sensed distances between the image processing apparatus 10 and persons. In the exemplary embodiment, "reducing the volume" includes not only lowering the volume but also setting the volume to zero and changing the timing to start outputting a sound.

In the exemplary embodiment, a method for providing a notification by the image processing apparatus 10 is not limited. Here, a description will be given of, as an example, a case where the image processing apparatus 10 performs announcement. The announcement according to the exemplary embodiment is programmed in advance, for example, with a volume, content of announcement, whether or not reannouncement will be performed, and so forth being designated. Hereinafter, announcement that is programmed is referred to as "programmed announcement". Reduction control according to the exemplary embodiment is performed on sound output of programmed announcement set by a user.

Furthermore, volume reduction control of programmed announcement according to the exemplary embodiment is performed for persons who are within a predetermined range of a space in which the image processing apparatus 10 is installed, including a person who is using the image processing apparatus 10 and a person who is not using the image processing apparatus 10 but is near the image processing apparatus 10.

The programmed announcement according to the exemplary embodiment is processed to be performed on the basis of the following method.

(1) Basic Process

Programmed announcement set in advance by a user is controlled in accordance with a condition of surroundings and a usage status. More specifically, the following process is performed.

At a programmed announcement time, the volume is adjusted (reduced) in accordance with a sensing status of a person by the human sensors of the image processing apparatus 10.

At a programmed announcement time, if the human sensors sense that there is a person in front of the image processing apparatus 10, a sound may be output at a volume lowered from a volume that is set when the programmed announcement is set. In this case, reannouncement (described below) may be performed.

At a programmed announcement time, if no person is sensed in front of the image processing apparatus 10, a sound is output at a volume that is set when the programmed announcement is set.

At a programmed announcement time, if the image processing apparatus 10 is being operated by a user, the apparatus may wait until the user completes the operation without performing announcement. In this case, announcement may be performed after the user completes the operation. Alternatively, announcement may be performed at a reduced volume, without waiting for completion of the operation.

Even if it is recognized that there is programmed announcement when the power of the image processing apparatus 10 is turned on after a predetermined time period elapses from when the power is turned off, announcement is not performed if a predetermined time period (for example, ten minutes or more) elapses from a scheduled announcement end time.

(2) Reannouncement

Reannouncement may be set when programming announcement, considering a case where announcement is not performed as programmed because of the volume being controlled due to sensing of a person by the human sensors. If reannouncement is set, announcement is performed again under the condition that is set when the announcement is programmed. Specifically, the following process is performed.

Announcement is performed in a state where no person is sensed by the human sensors.

In the case of performing the reannouncement described above, priority may be given to the reannouncement, and thus use of the image processing apparatus 10 may be prohibited until the reannouncement ends.

Reannouncement may be forcefully performed regardless of the presence or absence of an operator (reannouncement priority).

(3) Event

If an event is scheduled to be held and if notification of the event (hereinafter event notification) is scheduled, this is taken into consideration. In the exemplary embodiment, an "event" may be, for example, notification of a labor union meeting, a chime for a morning meeting, and an announcement to restrict overtime work. More specifically, the following process is performed.

If an event is scheduled to be held as well as programmed announcement and if the time to hold the event approaches, announcement to provide a notification of the event is forcefully performed.

(4) Urgency Announcement

If a degree of urgency is set to programmed announcement, the announcement is performed even if there is a person operating the image processing apparatus 10. In this case, a sound may be forcefully output at a volume that is set when the programmed announcement is set, the announcement may be performed at a reduced volume, or the announcement may be performed after displaying a notification about the announcement on the UI touch screen 216 so as to obtain permission from a user operating the image processing apparatus 10. In this case, a message "announcement will start after five seconds" or the like may be displayed.

Figure 5:
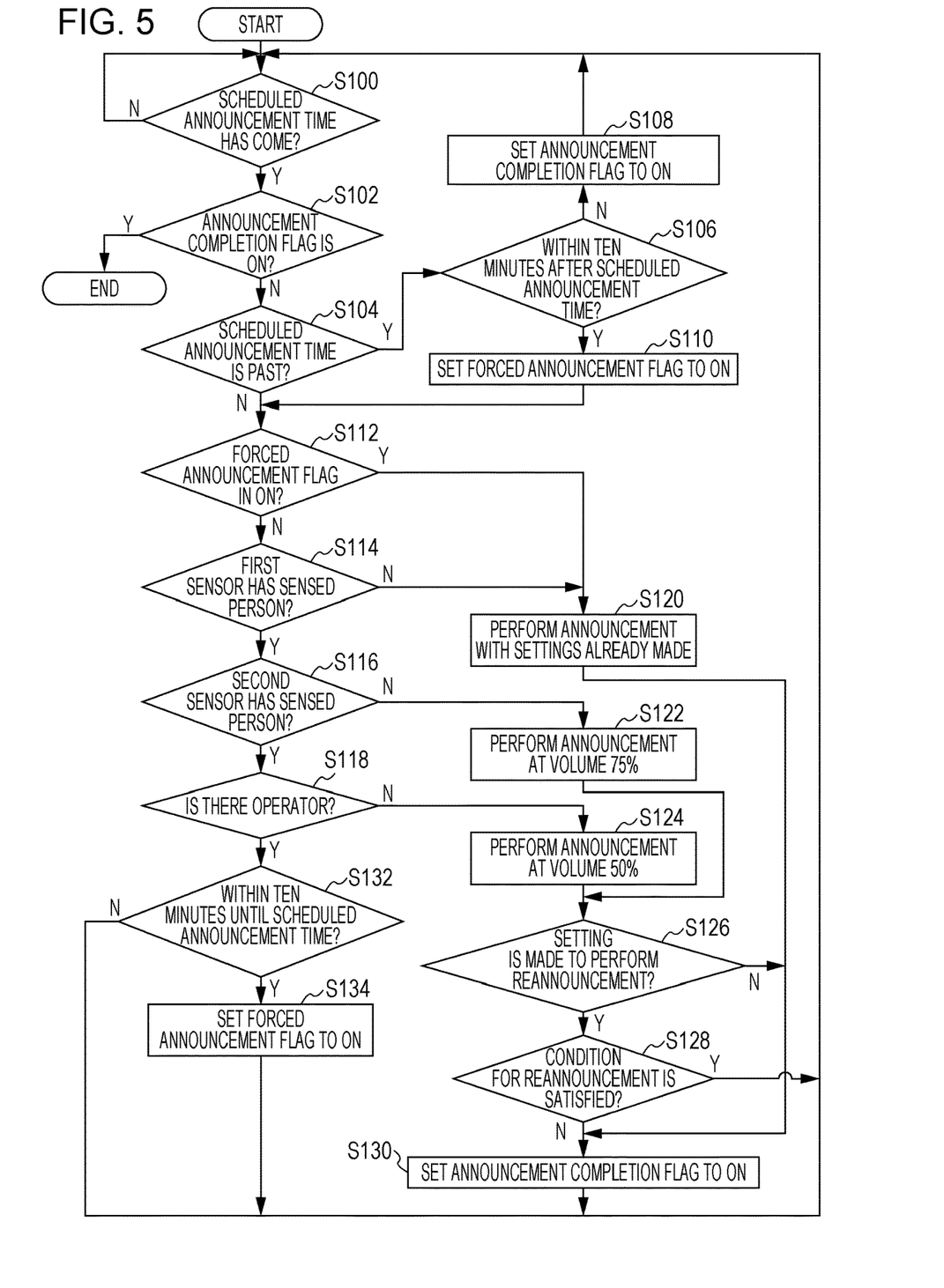
FIG. 5 is a flowchart illustrating a flow of a volume control process according to a first exemplary embodiment.

Next, a description will be given of a volume control process for controlling the volume of a sound output from the speaker 32 of the image processing apparatus 10 according to the exemplary embodiment with reference to FIG. 5. FIG. 5 is a flowchart illustrating a flow of a process performed in accordance with a volume control process program according to the exemplary embodiment in which programmed announcement is performed as an example. The process illustrated in FIG. 5 is performed, for example, when the image processing apparatus 10 is connected to the commercial power supply 242 and when the CPU (not illustrated) reads the volume control process program stored in the ROM (not illustrated). In the exemplary embodiment, a description will be given of an example in which the volume control process program is stored in the ROM or the like in advance, but the exemplary embodiment is not limited thereto. For example, the volume control process program may be provided while being stored in a computer-readable storage medium or may be distributed through a wired or wireless communication medium.

In the volume control process program illustrated in FIG. 5, it is assumed that programmed announcement is set in advance. A user who desires to communicate information through announcement in an office accesses the image processing apparatus 10 from his/her PC 21 through the communication network 20 by using, for example, a web browser, and sets programmed announcement. The programmed announcement may be directly registered in the image processing apparatus 10, or may be registered in a schedule managed in the cloud so that the image processing apparatus 10 refers to the schedule.

In the programmed announcement, the following settings are made, for example.

Volume of Announcement

A volume is set in accordance with a range within which a sound reaches, for example, to a low volume (for example, about a two-meter radius), a middle volume (for example, about a five-meter radius), and a high volume (for example, about a ten-meter radius). A volume for a maximum range (for example, about a ten-meter radius), that is, a maximum volume, may be regarded as 100, and an amount of reduction of the volume may be set by using a percentage (%) to the maximum volume.

Content of Announcement

The content is set by inputting text, for example. A sound is synthesized by the main controller 200 in accordance with the set text, and the sound is output from the speaker 32.

Voice Type of Announcement

For example, a voice type is set to "voice of businessman".

Announcement Time

For example, a time is set to "17:00 every day", or "9:00 from Monday to Friday".

Time to Hold Event

For example, a time is set to "18:00".

Degree of Urgency

For example, a degree of urgency is set to "low", "middle", or "high".

Whether or not Reannouncement Will be Performed

For example, "reannouncement will be performed" or "reannouncement will not be performed" is set.

An outline of the volume control process according to the exemplary embodiment is as follows. That is, the image processing apparatus 10 waits until a programmed announcement time that has been set comes. At the programmed announcement time, the human sensors sense the usage status of the image processing apparatus 10 and the condition of its surroundings, and accordingly an announcement method is determined. If there is a user who is operating (who has logged in to) the image processing apparatus 10 (for example, the person U4), a sound is output after it is determined that the use is finished (log off is performed) when the programmed announcement time comes. Determination is performed on the basis of the usage status, and in addition the volume is controlled in accordance with the condition of surroundings. If nobody is sensed by the human sensors (the first sensor 28 and the second sensor 30) at the programmed announcement time, for example, if the person U1 is the nearest person, it is determined that there is nobody around the image processing apparatus 10 and a sound is output as programmed. If a person is sensed by the first sensor 28 and if nobody is sensed by the second sensor 30, for example, if there is the person U2, a sound is output at a volume which is 75% of the maximum volume. If there is a person sensed by the second sensor 30 and if there is nobody operating the image processing apparatus 10, for example, if there is the person U3, a sound is output at a volume which is 50% of the maximum volume.

As illustrated in FIG. 5, in step S100, the image processing apparatus 10 waits until a scheduled announcement time comes. At the scheduled announcement time, the process proceeds to step S102.

In step S102, it is determined whether or not an announcement completion flag is set to "ON". If an affirmative determination is made, the volume control process program ends. If a negative determination is made, the process proceeds to step S104. In the exemplary embodiment, an "announcement completion flag" is a flag that is set to "ON" when announcement is completed or when announcement is considered to be completed.

In step S104, it is determined whether or not the scheduled announcement time is past. If a negative determination is made, the process proceeds to step S112. If an affirmative determination is made, the process proceeds to step S106.

In step S106, it is determined whether or not a current time is within ten minutes after the scheduled announcement time. If a negative determination is made, the process proceeds to step S108, where the announcement completion flag is set to "ON", and then the process returns to step S100. That is, if it is determined that ten minutes or more has elapsed from the scheduled announcement time, sound output of the programmed announcement is put off. On the other hand, if an affirmative determination is made in step S106, the process proceeds to step S110, where a forced announcement flag is set to "ON", and then the process proceeds to step S112. In the exemplary embodiment, a "forced announcement flag" is a flag that is set to "ON" in the case of forcefully performing announcement regardless of other conditions in the following process.

In step S112, it is determined whether or not the forced announcement flag is set to "ON". If an affirmative determination is made, the process proceeds to step S120. If a negative determination is made, the process proceeds to step S114.

In step S120, announcement is forcefully performed in accordance with the settings, including the setting of the volume, made in advance (made when the programmed announcement is set). Thereafter, the process proceeds to step S130, where the announcement completion flag is set to "ON", and then the process returns to step S100.

In step S114, it is determined whether or not the first sensor 28 has sensed a person. If a negative determination is made, the process proceeds to step S120, where announcement is performed in accordance with the settings made in advance. In this case, nobody has been sensed in the sensing region F, for example, the nearest person is the person U1, and thus it is determined that there is nothing against announcement at the volume that is set when the programmed announcement is set. On the other hand, if an affirmative determination is made in step S114, the process proceeds to step S116.

In step S116, it is determined whether or not the second sensor 30 has sensed a person. If a negative determination is made, the process proceeds to step S122, where the announcement is performed at a volume which is 75% of the volume that is set when the programmed announcement is set. This is because a person has been sensed inside the sensing region F and outside the sensing region N (for example, the person U2 is at the position P2 in FIG. 4). Thereafter, the process proceeds to step S126. On the other hand, if an affirmative determination is made in step S116, the process proceeds to step S118.

In step S118, it is determined whether or not there is an operator (user) of the image processing apparatus 10. If a negative determination is made, the process proceeds to step S124, where the announcement is performed at a volume which is 50% of the volume that is set when the programmed announcement is set. This is because a person has been sensed inside the sensing region N but it is determined that the person is not performing an operation (for example, the person U3 is at the position P3 in FIG. 4). Thereafter, the process proceeds to step S126. On the other hand, if an affirmative determination is made in step S118, the process proceeds to step S132.

In step S126, it is determined whether or not a setting has been made to "perform reannouncement". If a negative determination is made, the process proceeds to step S130, where the announcement completion flag is set to "ON" to end the programmed announcement, and then the process returns to step S100. On the other hand, if an affirmative determination is made in step S126, the process proceeds to step S128.

In step S128, it is determined whether or not a condition for reannouncement is satisfied. If an affirmative determination is made, the process returns to step S100 to perform reannouncement. On the other hand, if a negative determination is made in step S128, the process proceeds to step S130, where the announcement completion flag is set to "ON", and then the process returns to step S100. This is because the condition for reannouncement is not satisfied and thus the reannouncement is put off.

In step S132, it is determined whether or not the time left until the scheduled announcement time is within ten minutes. If a negative determination is made, the process returns to step S100. This is because an operator (the person U4) has been sensed but there is a time left until the scheduled announcement time and thus the apparatus waits for a while. On the other hand, it an affirmative determination is made in step S132, the process proceeds to step S134, where the forced announcement flag is set to "ON", and then the process returns to step S100. This is because an operator has been sensed but there is no much time left until the scheduled announcement time and thus the announcement is forcefully performed.

As described above, in the image processing apparatus (information processing apparatus) according to the exemplary embodiment, in the case of outputting a sound at a high volume over a wide range from the image processing apparatus (information processing apparatus), the volume of the output sound is appropriately determined in accordance with a condition of surroundings and a usage status of the image processing apparatus (information processing apparatus) at the timing to perform announcement. Thus, information communication over a wide range, which is an original purpose, may be reliably performed, with a situation being prevented from occurring where persons around the apparatus are surprised and with psychological burden of the persons being reduced.

In the image processing apparatus (information processing apparatus) according to the exemplary embodiment having the above-described volume control function, control is performed to output a sound at a volume suitable for a person who is near a portion outputting the sound, in the case of providing a notification about something over a wide range.

In the above-described exemplary embodiment, a description has been given of a volume control process for programmed announcement as an example, but the exemplary embodiment is not limited thereto. For example, a flowchart similar to that illustrated in FIG. 5 may be used for a volume control process for an event. In this case, "announcement" may be replaced with "event".

Hereinafter, an additional description will be given of the volume control process according to the exemplary embodiment.

In the above-described exemplary embodiment, the single speaker 32 built in the image processing apparatus (information processing apparatus) is used as a speaker, but the speaker is not limited thereto. For example, two speakers may be provided, normal announcement may be performed using one of the two speakers, and announcement at a reduced volume may be performed using the other speaker. Alternatively, a directional speaker may be used as the speaker 32, and switching between normal announcement and announcement at a reduced volume may be performed by considering directivity.

If an error (for example, paper out) occurs in the image processing apparatus (information processing apparatus), that is, if an error notification is provided, a sound may be output at a volume that is set in accordance with a distance to the nearest person. In this case, if the nearest person does not eliminate the error, a sound is output at a volume that is set in accordance with a distance to the second nearest person. This is repeated for the third nearest person, fourth nearest person, and so forth, and the error notification stops upon the error being eliminated.

Programmed announcement is not limited to announcement that uses a sound recorded in advance, and may include real-time announcement. Furthermore, in this case, the image processing apparatus (information processing apparatus) may include a recording unit. In this case, the content of the announcement may be recorded in a cache and announcement timing may be delayed. The announcement timing may be delayed also when real-time announcement is performed.

The volume control process according to the exemplary embodiment may be applied to control of sound output for a person carrying a mobile terminal, such as a smartphone or tablet PC. More specifically, a notification is provided by using a sound at a volume set in advance if the user is not using the mobile terminal, if the user is not operating the mobile terminal, if the user is not carrying the mobile terminal, or if the user is not near the image processing apparatus (information processing apparatus), at the timing to output the sound. On the other hand, if it is determined that the user is near the image processing apparatus (information processing apparatus) while operating or carrying the mobile terminal such as a smartphone at the timing to output the sound, the volume of the output sound is lowered, or announcement is not performed and only display on a screen is performed. Change to the process of lowering the volume or not performing announcement may be performed in accordance with the degree of urgency of the announcement (for example, earthquake early warning). Whether or not the user is near the image processing apparatus (information processing apparatus) may be determined on the basis of, for example, an operation of the touch screen of the mobile terminal, a login state of the mobile terminal, a gyro sensor of the mobile terminal, an infrared sensor of the mobile terminal, or the like.

Regarding a sound for providing information to an operator (for example, a loudness of a button press beep), not announcement or an event, it is not necessary to reduce the volume. That is, such a sound may be output at a volume set in the information processing apparatus.

Second Exemplary Embodiment

In the above exemplary embodiment, a description has been given of the image processing apparatus 10 as an example of the information processing apparatus, but the information processing apparatus according to the exemplary embodiment is not limited to an image processing apparatus. Hereinafter, a description will be given of an example in which an information processing apparatus other than an image processing apparatus is used.

(1) Vending Machine as Information Processing Apparatus

A vending machine that includes a sound output device and human sensors like those described in the above exemplary embodiment and that is capable of outputting a sound may be used. A notification (advertisement) may be provided in various manners by using such a vending machine. In this case, volume control is performed in accordance with a distance to a user. That is, if there is a person standing in front of the vending machine or using the vending machine, a sound is output at such a volume that the sound reaches only the person in front of the vending machine. If there is a person passing by, a sound is output at a higher volume.

(2) Signage as Information Processing Apparatus

Signage (or digital signage) is a general name for systems that provide information by using an electronic display device such as a display in various locations, for example, outdoors, storefront, public space, and transportation facilities. The volume control process according to the exemplary embodiment may be applied to signage including a sound output device and human sensors like those described in the above exemplary embodiment.

In the above exemplary embodiment, a description has been given of an example in which a speaker provided in the information processing apparatus is used, but the exemplary embodiment is not limited thereto. For example, the speaker 40 provided to the floor illustrated in FIG. 2 may be used. In this case, for example, the speaker 40 is connected to the main controller 200 through a dedicated line or the communication network 20, and a sound whose volume is controlled by the main controller 200 is output.

In the above exemplary embodiment, a description has been given of an example in which human sensors are provided in the information processing apparatus, but the exemplary embodiment is not limited thereto, and the human sensors may be provided outside the information processing apparatus. In this case, the human sensors provided outside the information processing apparatus are connected to a controller of the information processing apparatus, such as the main controller 200, through the communication network 20 or the like, and the controller performs a volume control process by using information obtained from the human sensors. Furthermore, in the above exemplary embodiment, a description has been given of an example in which two human sensors whose sensing regions are different from each other are used as human sensors. However, the exemplary embodiment is not limited thereto, and one human sensor (either the first sensor 28 or the second sensor 30 may be used, for example, the second sensor 28) may be used. In this case, if a person is sensed by the second sensor 28, the volume of an output sound is reduced.

In the above exemplary embodiment, a description has been given of an example in which human sensors are used as sensors that sense a person. However, the exemplary embodiment is not limited thereto, and a camera or the like may be used. In this case, the camera may be built in the information processing apparatus or may be installed outside the information processing apparatus. In a case where the camera is built in the information processing apparatus, the camera is connected to a controller of the information processing apparatus such as the main controller 200, and the controller performs a volume control process by using information obtained from the camera. On the other hand, in a case where the camera is installed outside the information processing apparatus, for example, the camera located at a position similar to that of the speaker 40 illustrated in FIG. 2 is connected to a controller of the information processing apparatus such as the main controller 200 through the communication network 20 or the like, and the controller performs a volume control process by using information obtained from the camera.

The sensors that sense a person may be provided outside, not inside, the information processing apparatus. In the case of providing the sensors outside the information processing apparatus, the sensors may be provided on, for example, a ceiling, a wall, or a door. In this case, the information processing apparatus senses a person on the basis of sensor information obtained from the sensors provided outside.

In the above exemplary embodiment, a description has been given of an example in which the volume of an output sound is reduced in accordance with a distance to a person who has been sensed, but the exemplary embodiment is not limited thereto. For example, the volume may be adjusted in accordance with a distance to a person who has been sensed, that is, the volume control may include not only lowering the volume but also raising the volume. For example, if a range of persons for which a notification is to be provided through announcement is extended from when programmed announcement is set, announcement may be performed at a volume higher than the volume that is set in advance (for example, 120% of the maximum volume).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image forming unit configured to form an image on a recording medium;
   an image reading unit configured to read a document image;
   a camera configured to detect a person;
   an output unit configured to output a first notification sound at a first predetermined time and at a first predetermined sound level, and second notification sound at second predetermined time and at second predetermined sound level, wherein the first notification sound and the second notification sound each include predetermined text output as spoken announcements; and
   a processor and memory configured to perform the following:
   if it is detected that a user is performing an operation of at least one of printing, copying, scanning, or facsimile transmission or reception on the image processing apparatus after output of the first notification sound, delay the output of the second notification sound until the user completes the operation; and
   after expiration of the delay, the processor reduces the volume of the second notification sound to a non-zero value below the second predetermined sound level when the camera detects the person, and does not reduce a volume of the second notification sound when the camera does not detect the person.

2. The image processing apparatus according to claim 1, wherein
   the processor is further configured to change how much the volume is reduced in accordance with a distance between the information processing apparatus and the person, the distance being sensed by the camera.

3. The image processing apparatus according to claim 2, further comprising a plurality of sensors that have different sensing ranges, and among the sensing ranges of the plurality of sensors, a narrower sensing range is set to be included in a wider sensing range.

4. The image processing apparatus according to claim 2, further comprising:
   a detector that detects a failure of the information processing apparatus,
   wherein if the first notification sound includes a notification of the failure, the processor is further configured to control the output unit to output the notification sound at a volume set for a person nearest to the information processing apparatus among persons sensed by the plurality of sensors.

5. The image processing apparatus according to claim 1, wherein if the processor has controlled the output unit to reduce the volume, the processor is further configured to control the output unit to output the second notification sound again at the predetermined volume.

6. The image processing apparatus according to claim 1, wherein the first notification sound is delayed if any user input to the information processing apparatus is detected after output of the first notification sound, and after expiration of the delay, the processor reduces the volume of the second notification sound to a non-zero value below the second predetermined sound level based solely on detection of a presence of a person near the information processing apparatus when the camera detects the person near the information processing apparatus, and does not reduce a volume of the second notification sound when the camera does not detect the presence of the person near the information processing apparatus.

7. The image processing apparatus according to claim 1, wherein if it is detected that a user is performing the operation on the image processing apparatus after output of the first notification sound, the processor and memory are configured to delay the output of the second notification sound unless an announcement to be recited with the second notification sound is a predetermined urgent announcement, and when the announcement to be recited with the second notification sound is the predetermined urgent announcement, the second notification sound is output after a textual message is displayed to the user.

8. An image processing apparatus comprising:
   an image forming unit configured to form an image on a recording medium;
   an image reading unit configured to read a document image;
   a camera configured to detect a person;
   an output unit configured to output a first notification sound at a first predetermined time and at a first predetermined sound level, and a second notification sound at second predetermined time and at second predetermined sound level, wherein the first notification sound and the second notification sound each include predetermined text output as spoken announcements; and
   a processor and memory configured to perform the following:
   if it is detected that a user is performing an operation of at least one of printing, copying, scanning, or facsimile transmission or reception on the image processing apparatus after output of the first notification sound, the processor reduces the volume of the second notification sound to a non-zero value below the second predetermined sound level when the camera detects the person, and does not reduce a volume of the second notification sound when the camera does not detect the person.

9. The image processing apparatus according to claim 1, wherein the processor is further configured to reduce the volume of the first and/or second notification sound based on a login state.

* * * * *